United States Patent
Karimli et al.

(10) Patent No.: US 10,264,446 B2
(45) Date of Patent: *Apr. 16, 2019

(54) IOT-CONNECTED DEVICES AND EQUIPMENT AUTOMATED LOGIN SYSTEM (71) Applicant: T-Mobile USA, Inc., Bellevue, WA (US)

(72) Inventors: Yasmin Karimli, Kirkland, WA (US); Gunjan Nimbavikar, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/959,793

(22) Filed: Apr. 23, 2018

(65) Prior Publication Data

US 2018/0241876 A1 Aug. 23, 2018

Related U.S. Application Data (63) Continuation of application No. 15/441,105, filed on Feb. 23, 2017, now Pat. No. 9,967,395.

(51) Int. Cl.
H04M 3/42 (2006.01)
H04W 8/26 (2009.01)
(Continued)

(52) U.S. Cl.
CPC ....... *H04W 8/265* (2013.01); *H04M 3/42272* (2013.01); *H04M 15/75* (2013.01);
(Continued)

(58) Field of Classification Search
CPC ......... H04M 3/42229; H04M 315/765; H04M 2203/6054; H04M 2215/0196;
(Continued)

(56) References Cited

U.S. PATENT DOCUMENTS 6,704,039 B2 * 3/2004 Pena ...................... G06Q 20/04
348/14.01
8,081,849 B2 * 12/2011 King ...................... G06K 9/228
382/305
(Continued)

FOREIGN PATENT DOCUMENTS

CN 105307117 2/2016
CN 105307117 A * 2/2016 .......... H04W 72/005
(Continued)

*Primary Examiner* — Mahendra Patel
(74) *Attorney, Agent, or Firm* — Knobbe Martens Olson & Bear LLP (57) ABSTRACT A modified telecommunications system is provided herein in which UEs can be associated with a user account using information other than SIM card data or a username and password combination. For example, when a subscriber activates a user account, the subscriber may be requested to provide a signature. A signature can include a unique PIN, a sample voice command, a fingerprint, a retinal scan, and/or the like. The signature may be stored in a data store in an entry corresponding to the user account. To associate a UE with a user account, the subscriber can provide a signature via the UE. The UE can then transmit the provided signature and a UE address to a management system. The management system can then store the UE address in the data store in an entry associated with the user account that corresponds with the provided signature.

20 Claims, 5 Drawing Sheets (51) Int. Cl.
*H04M 15/00* (2006.01)
*H04W 4/24* (2018.01)

(52) U.S. Cl.
CPC ....... *H04M 15/751* (2013.01); *H04M 15/765* (2013.01); *H04W 4/24* (2013.01); *H04M 2203/6054* (2013.01)

(58) Field of Classification Search
CPC ..... H04W 12/06; H04W 4/005; H04W 8/265; H04W 4/00; H04W 8/26; H04W 12/10; G06Q 20/20; G06Q 30/00; G06Q 20/32; G06Q 20/3223; G06Q 20/3229; G07C 13/00; H04L 63/10; H04L 63/12
USPC .................. 455/414.1, 450, 435.1; 370/328; 709/223
See application file for complete search history.

(56) References Cited

U.S. PATENT DOCUMENTS

| | | | | |
|---|---|---|---|---|
| 8,115,596 | B2* | 2/2012 | Lund | G06F 21/305 340/10.1 |
| 2004/0232220 | A1* | 11/2004 | Beenau | G01D 21/00 235/380 |
| 2005/0177517 | A1* | 8/2005 | Leung | G06Q 20/20 705/64 |
| 2009/0187425 | A1* | 7/2009 | Thompson | G06N 5/04 705/3 |
| 2010/0057485 | A1* | 3/2010 | Luft | H04W 4/70 455/411 |
| 2012/0164982 | A1* | 6/2012 | Klein | G07C 13/00 455/411 |
| 2013/0085815 | A1* | 4/2013 | Onischuk | G07C 13/00 705/12 |
| 2014/0244001 | A1* | 8/2014 | Glickfield | H04L 67/16 700/33 |
| 2015/0067172 | A1* | 3/2015 | Ashokan | H04L 47/743 709/226 |
| 2015/0222621 | A1* | 8/2015 | Baum | H04W 4/70 726/9 |
| 2015/0365278 | A1* | 12/2015 | Chakrabarti | H04L 41/0806 370/254 |
| 2016/0006837 | A1* | 1/2016 | Reynolds | H04W 84/18 709/203 |
| 2016/0066137 | A1* | 3/2016 | Kulkarni | H04W 4/02 455/456.1 |
| 2016/0072832 | A1* | 3/2016 | Kim | G06F 21/552 726/23 |
| 2016/0226732 | A1* | 8/2016 | Kim | H04L 12/2807 |
| 2017/0126836 | A1* | 5/2017 | Krishna | H04L 67/32 |
| 2017/0195424 | A1* | 7/2017 | Nasir | H04L 67/125 |

FOREIGN PATENT DOCUMENTS

| | | | | |
|---|---|---|---|---|
| WO | WO 2011/110539 | | 9/2011 | |
| WO | WO-2011110539 A1 * | 9/2011 | ........... H04L 9/3234 |
| WO | WO-2011110539 A9 * | 10/2012 | ........... H04L 9/3234 |
| WO | WO 2016/186417 | | 11/2016 | |
| WO | WO-2016186417 A1 * | 11/2016 | ............. F24F 11/00 |

* cited by examiner

IOT-CONNECTED DEVICES AND EQUIPMENT AUTOMATED LOGIN SYSTEM

CROSS-REFERENCE TO RELATED APPLICATIONS

This application is a continuation of U.S. patent application Ser. No. 15/441,105, entitled "IOT-CONNECTED DEVICES AND EQUIPMENT AUTOMATED LOGIN" and filed on Feb. 23, 2017, issued as U.S. Pat. No. 9,967,395, the entirety of which is hereby incorporated herein by reference.

BACKGROUND

A core network (also known as network core or backbone network) is the central part of a telecommunications network that provides various services to telecommunication devices, often referred to as user equipment ("UE"), that are connected by access network(s) of the telecommunications network. Typically, a core network includes high capacity communication facilities that connect primary nodes, and provides paths for the exchange of information between different sub-networks.

Conventionally, telecommunications systems are designed such that a single UE is assigned a single telephone number. Thus, a user of a first UE can initiate a communication (e.g., a call, a text message, an electronic mail message, etc.) with a second UE by entering the telephone number assigned to the second UE. The first UE and the second UE can then exchange communications via the access network(s) and the core network.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

As described above, a single UE is assigned a single telephone number in conventional telecommunications systems. This, however, may be inconvenient to a subscriber or user. For example, many subscribers own and/or operate multiple UEs, such as a cell phone, a tablet, a wearable device, a laptop, and/or the like. In certain situations, a first UE may be more accessible to a subscriber than a second UE. If a particular telephone number is assigned to the second UE, the subscriber is then prevented from using the first UE to handle communications directed at the telephone number even though the first UE is more accessible. As another example, a single subscriber may have multiple phone numbers—one for work, one for home, one for international calls, and/or the like. In conventional telecommunications systems, the subscriber has no choice but to carry multiple UEs in order to be able to answer communications directed at any one of the phone numbers.

Thus, a telecommunications system can be modified to allow a single UE to be assigned multiple phone numbers and to allow a single phone number to be assigned to multiple UEs. One of the ways in which the telecommunications system can be modified is by implementing an activation process that allows UEs to associate with a particular user account and that allows multiple telephone numbers to be associated with a particular user account. Accordingly, described herein is a modified telecommunications system in which UEs can request association with a user account and in which multiple telephone numbers can be associated with a single user account.

A user account may be associated with a username and password combination. Thus, in typical scenarios, a subscriber may associate a UE with the subscriber's user account by entering the username and password combination on the UE. However, this may not be possible with certain UEs. For example, UEs like appliances (e.g., refrigerators, washing machines, dryers, dishwashers, etc.), televisions, control systems (e.g., thermostats, light fixtures, etc.), and/or the like may not have the buttons or interface necessary for a subscriber to enter a username or password.

Accordingly, also described herein is a modified telecommunications system in which UEs can be associated with a user account using information other than a username and password combination. For example, when a subscriber activates a user account corresponding to a telephone number, the subscriber may be requested to provide a username, a password, and one or more additional signatures. An additional signature can include a unique personal identification number (PIN), a sample voice command, a fingerprint, a retinal scan, and/or the like. The username, password, and one or more additional signatures may be stored with the telephone number in an entry corresponding to the user account in a data store.

If the subscriber selects a UE to associate with the user account and the UE does not include the user input device(s) necessary to allow the subscriber to provide a username and password combination, the subscriber can instead provide one of the signatures via the UE. The UE can then transmit the provided signature and an address of the UE to a UE management system. The UE management system can query the data store to identify which user account is associated with the provided signature and store the UE address in the data store in an entry associated with the identified user account.

At a later time, the modified telecommunications network may receive a request from a first UE to establish a connection with a UE associated with a particular telephone number. In response to receiving the request, a call routing system of the modified telecommunications network can query the data store to identify UE(s) associated with the telephone number. Once identified, the call routing system can transmit the connection request to one or more of the associated UEs.

Conversely, a subscriber can use any UE associated with the subscriber's user account to initiate a connection with another UE. For example, the subscriber can provide a telephone number of a third party UE. The call routing system can receive the connection request and, using the UE address, identify a telephone number associated with the UE that is requesting the connection. The call routing system can then forward the request to the appropriate third party UE (or to the sub-network and/or core network of the third part UE), identifying the source as a UE associated with the identified telephone number. Thus, a subscriber can initiate or receive a communication on virtually any network-enabled UE.

The foregoing aspects and many of the attendant advantages of this disclosure will become more readily appreciated as the same become better understood by reference to the following detailed description, when taken in conjunction with the accompanying drawings.

Example User Equipment Management and Communication Routing Environment

Figure 1:
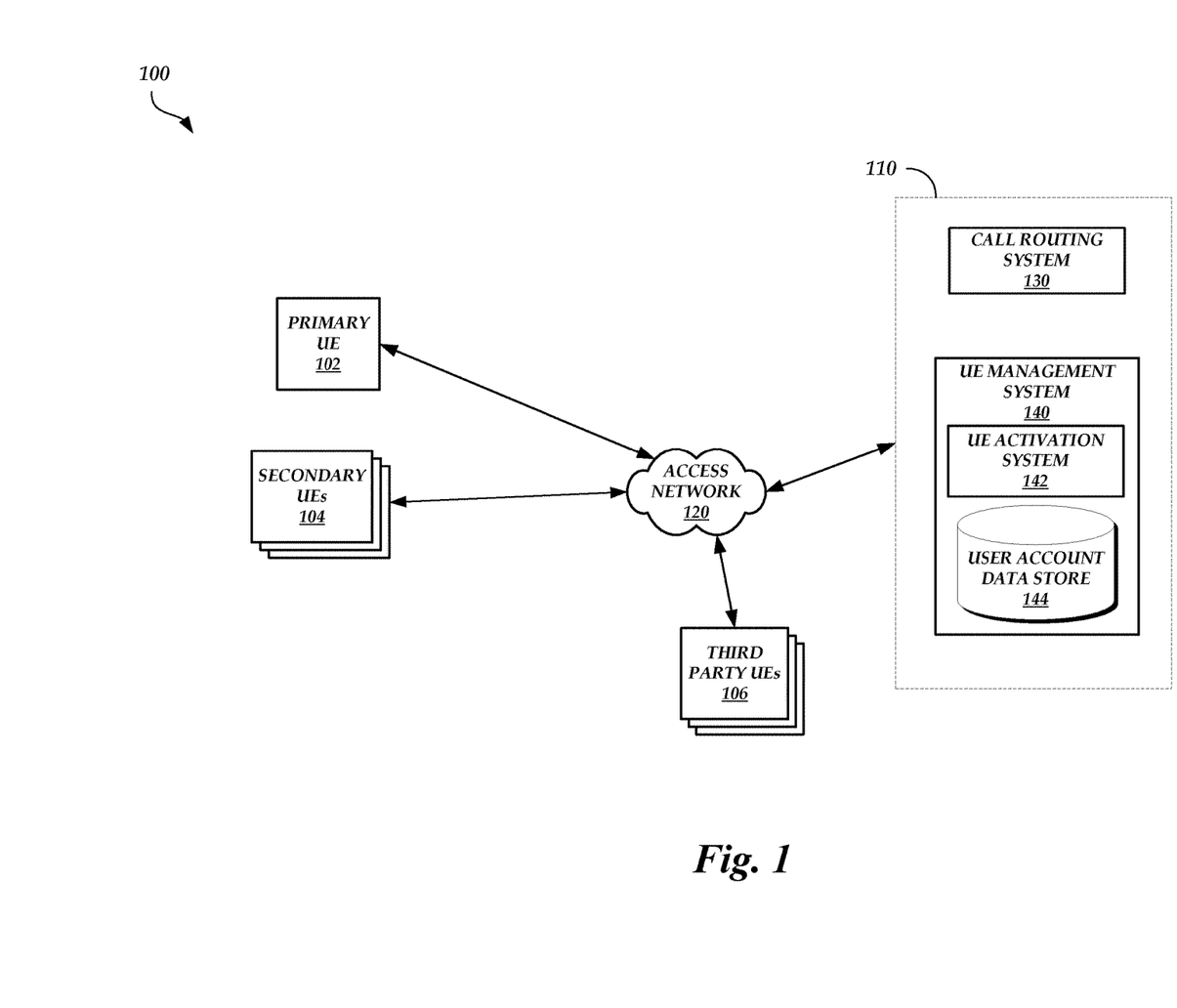
FIG. 1 is a block diagram of an illustrative UE management and communication routing environment in which a UE management system manages the association of a primary UE and one or more secondary UEs with a user account and in which a call routing system manages the routing of communications between two or more UEs.

FIG. 1 is a block diagram of an illustrative UE management and communication routing environment 100 in which a UE management system 140 manages the association of a primary UE 102 and one or more secondary UEs 104 with a user account and in which a call routing system 130 manages the routing of communications between two or more UEs. As used herein, the primary UE 102 refers to a UE operated by a subscriber when the subscriber activates a user account and the secondary UEs 104 refer to UEs that, while not used by a subscriber to activate a user account, may still be associated with the user account and can be used to receive and/or initiate communications with other UEs. In an embodiment, the primary UE 102 and the one or more secondary UEs are operated by the same subscriber or group of subscribers. Third party UEs 106 may refer to UEs that are operated by subscribers other than the subscriber or group of subscribers that operate the primary UE 102 and the one or more secondary UEs 104.

The primary UE 102 can be any computing device, such as a desktop, laptop or tablet computer, personal computer, wearable computer, server, personal digital assistant (PDA), hybrid PDA/mobile phone, electronic book reader, appliance (e.g., refrigerator, washing machine, dryer, dishwasher, etc.), integrated component for inclusion in computing devices, home electronics (e.g., television, set-top box, receiver, etc.), vehicle, machinery, landline telephone, network-based telephone (e.g., voice over Internet protocol ("VoIP")), cordless telephone, cellular telephone, smart phone, modem, gaming device, media device, control system (e.g., thermostat, light fixture, etc.), and/or any other type of Internet of Things (IoT) device or equipment. In an illustrative embodiment, the primary UE 102 includes a wide variety of software and hardware components for establishing communications over one or more communication networks, including an access network 120, a core network 110, and/or other private or public networks. For example, the primary UE 102 may include a subscriber identification module (SIM) card (e.g., an integrated circuit that stores data to identify and authenticate a UE that communicates over a telecommunications network) and/or other component(s) that enable the primary UE 102 to communicate over the access network 120, the core network 110, and/or other private or public networks via a radio area network (RAN) and/or a wireless local area network (WLAN). The SIM card may be assigned to a particular user account and the data stored within the SIM card may be stored in user account data store 144 in an entry associated with the user account.

The one or more secondary UEs 104 can also each be any computing device, such as a desktop, laptop or tablet computer, personal computer, wearable computer, server, personal digital assistant (PDA), hybrid PDA/mobile phone, electronic book reader, appliance, integrated component for inclusion in computing devices, home electronics, vehicle, machinery, landline telephone, network-based telephone, cordless telephone, cellular telephone, smart phone, modem, gaming device, media device, control system, and/or any other type of IoT device or equipment. In an illustrative embodiment, the one or more secondary UEs 104 includes a wide variety of software and hardware components for establishing communications over one or more communication networks, including the access network 120, the core network 110, and/or other private or public networks. Each secondary UE 104 may include component(s) that enables the respective secondary UE 104 to communicate over the access network 120, the core network 110, and/or other private or public networks via a WLAN. However, while some secondary UEs 104 may include the same communication components as the primary UE 102, other secondary UEs 104 may not include a SIM card or other component(s) that enables the respective secondary UE 104 to communicate over the access network 120, the core network 110, and/or other private or public networks via a RAN. For example, a tablet may be a secondary UE 104 and may include a SIM card that allows the tablet to communicate over the access network 120, the core network 110, and/or other private or public networks via a RAN. On the other hand, an appliance like a refrigerator may have components that allow the refrigerator to communicate over the access network 120, the core network 110, and/or other private or public networks via a WLAN, but not a RAN.

The primary UE 102 and/or the one or more secondary UEs 104 may further include components and/or be coupled to devices that allow a subscriber to create and store a signature. For example, the primary UE 102 and/or the one or more secondary UEs 104 may include at least one of a fingerprint scanner, a retinal scanner (e.g., a camera), a microphone (e.g., to capture voice commands), a numerical or alphanumerical keypad (e.g., to enter a PIN), and/or the like.

Like the primary UE 102 and the one or more secondary UEs 104, the third party UEs 106 can also each be any computing device, such as a desktop, laptop or tablet computer, personal computer, wearable computer, server, personal digital assistant (PDA), hybrid PDA/mobile phone, electronic book reader, appliance, integrated component for inclusion in computing devices, home electronics, vehicle, machinery, landline telephone, network-based telephone, cordless telephone, cellular telephone, smart phone, modem, gaming device, media device, control system, and/or any other type of IoT device or equipment. In an illustrative embodiment, the third party UEs 106 each include a wide variety of software and hardware components for establishing communications over one or more communication networks, including the access network 120, the core network 110, and/or other private or public networks.

The UEs 102, 104, and 106 are communicatively connected via the access network 120, such as GSM EDGE Radio Access Network (GRAN), GSM EDGE Radio Access Network (GERAN), Universal Terrestrial Radio Access Network (UTRAN), Evolved Universal Terrestrial Radio Access (E-UTRAN), and/or the like. Illustratively, the access network 120 is distributed over land areas called cells, each served by at least one fixed-location transceiver, known as a cell site or base station. The base station provides the cell with the network coverage which can be used for transmission of voice, messages, or other data. A cell might use a different set of frequencies from neighboring cells, to avoid interference and provide guaranteed service quality within each cell. When joined together these cells provide radio coverage over a wide geographic area. This enables a large number of UEs 102, 104, and 106 to communicate via the fixed-location transceivers. Although the access network 120 is illustrated as a single network, one skilled in the relevant art will appreciate that the access network can be include any number of public or private communication networks and/or network connections.

The core network 110 provides various services to UEs 102, 104, and 106 that are connected via the access network 120. One of the main functions of the core network 110 is to route telephone calls, messages, and/or other data across a public switched telephone network (PSTN) or Internet protocol (IP) Multimedia Subsystem (IMS). For example, the core network 110 may include the call routing system 130, which routes telephone calls, messages, and/or other data across a PSTN or IMS. The core network 110 may provide high capacity communication facilities that connect various nodes implemented on one or more computing devices, allowing the nodes to exchange information via various paths.

Certain core network 110 nodes may be associated with the UE management system 140, which may manage and store details of each UE 102, 104, and 106 subscriber that is authorized to use the core network 110 (e.g., the home location register (HLR) in GSM networks, home subscriber server (HSS) in IMS networks, home subscriber server (HSS) or user profile server function (UPSF) in IMS networks, and/or the like). The UE management system 140 may communicate with nodes associated with various local systems (e.g., visitor location registers (VLRs), serving GPRS support nodes (SGSNs), mobility management entities (MMEs), and/or the like) within the core network 110 to manage and provide services (e.g., association of UEs with user accounts, authentication, service invocation, and/or the like) to various UEs 102, 104, and 106.

As illustrated in FIG. 1, the UE management system 140 may include several components, including a UE activation system 142 and the user account data store 144. The UE activation system 142 is configured to associate the primary UE 102 and/or the secondary UEs 104 with a particular user account. For example, the UE activation system 142 may receive a request from the primary UE 102 to be associated with a user account. The request may include SIM card data that identifies the subscriber of the primary UE 102 and/or an address of the primary UE 102 (e.g., an IP address, a media access control (MAC) address, and/or another unique address). Upon receiving the request, the UE activation system 142 can verify whether the primary UE 102 is authorized to access the core network 110 and/or access network 120 by querying the user account data store 144 to determine whether the provided SIM card data corresponds to SIM card data stored in association with an authorized user account in the user account data store 144. If the provided SIM card data matches SIM card data stored in association with a particular user account in the user account data store 144, then the UE activation system 142 determines that the primary UE 102 is authorized to access the core network 110 and/or the access network 120. On the other hand, if the provided SIM card data does not match SIM card data stored in association with any user account in the user account data store 144, then the UE activation system 142 determines that the primary UE 102 is not authorized to access the core network 110 or access network 120. If the primary UE 102 is authorized to access the core network 110 and/or access network 120, then the UE activation system 142 may store the primary UE 102 address in an entry associated with the identified user account (e.g., the user account associated with SIM card data that matches the provided SIM card data). Thus, the primary UE 102 may then be recognized as a UE owned or operated by the subscriber or group of subscribers associated with the identified user account.

Before or after storing the primary UE 102 address and after determining that the primary UE 102 is authorized to access the core network 110 or access network 120, the UE activation system 142 may request that the primary UE 102 provide a username and password combination and/or one or more signatures. As an example, the UE activation system 142 can prompt the primary UE 102 to ask the subscriber to provide a signature like a sample fingerprint scan, an alphanumeric PIN, a sample retinal scan, a voice command (e.g., an identification of a keyword and a sample utterance provided by the subscriber saying the keyword), and/or the like. The UE activation system 142 can then store the username and password combination and the one or more signatures in the user account data store 144 in an entry associated with the identified user account.

In some embodiments, a subscriber may attempt to activate a secondary UE 104 for use over the core network 110 and/or the access network 120. The UE activation system 142 may therefore receive a request from the secondary UE 104 to be associated with a user account. As described above, some secondary UEs 104 may include a SIM card and thus the request may include the SIM card data and/or an address of the secondary UE 104. In this situation, the UE activation system 142 may use the SIM card data as described above in order to verify whether the secondary UE 104 is authorized to access the core network 110 and/or the access network 104 and store the address in the user account data store 144 if the secondary UE 104 is so authorized.

However, as described above, other secondary UEs 104 may not include a SIM card. In one illustrative example, while the secondary UE 104 may not include a SIM card, the secondary UE 104 may include an input device (e.g., a keyboard, keypad, infrared reader that receives signals from a remote, a mouse, a touchscreen, etc.) that allows the subscriber or user to enter a username and password combination. Thus, the request may include a username and password combination provided by the subscriber. The UE activation system 142 can query the user account data store 144 to determine whether the provided username and password combination matches a username and password combination stored in the user account data store 144. If there is a match, then the UE activation system 142 may store the secondary UE 104 address in an entry in the user account data store 144 that corresponds with the user account from which the matching username and password combination was retrieved.

In another illustrative example, the secondary UE 104 does not include a SIM card and does not include any input device that allows a subscriber to provide a username and password combination. The secondary UE 104 may, however, include a component or be coupled to a device that allows the subscriber to provide one or more signatures. For example, the secondary UE 104 may include or be coupled to a fingerprint scanner. Thus, the subscriber can be prompted to provide a fingerprint scan and the fingerprint scan can be included in the request. As another example, the secondary UE 104 may include or be coupled to a keypad. Thus, the subscriber can be prompted to provide a PIN and the provided PIN can be included in the request. As another example, the secondary UE 104 may include or be coupled to a camera or a specific device configured to scan retinas. Thus, the subscriber can be prompted to provide a retinal scan and the retinal scan can be included in the request. As another example, the secondary UE 104 may include or be coupled to a microphone. Thus, the subscriber can be prompted to provide a voice command and the captured utterance can be included in the request. The UE activation system 142 can query the user account data store 144 to determine whether the provided signature(s) matches a signature(s) stored in the user account data store 144. In the case of a voice command, a match may constitute a match of the keyword uttered in the provided signature and the keyword uttered in the stored signature (based on the results of speech recognition processing performed on the provided utterance) and/or a match of the characteristics of the utterance in the provided signature and the characteristics of the utterance in the stored signature (e.g., pitch, accent, speech pattern, etc.). If there is a match, then the UE activation system 142 may store the secondary UE 104 address in an entry in the user account data store 144 that corresponds with the user account from which the matching signature(s) was retrieved.

While fingerprint scans, PINs, retinal scans, and voice commands provided as examples of signatures, this is not meant to be limiting. A signature can be any type of data that is capable of uniquely identifying a subscriber (or a group of subscribers).

Accordingly, the user account data store 144 may store data for various user accounts. The data stored in association with a single user account may include SIM card data, one or more telephone numbers, a username and password combination, one or more signatures, and one or more UE 102, 104 addresses. The one or more telephone numbers may be stored in association with a user account when, for example, a subscriber obtains a communication plan through the operator of the core network 110 and/or access network 120.

The data stored in the user account data store 144 may allow a third party UE 106 to communicate with any UE 102, 104 associated with a user account, regardless of whether the UE 102, 104 is a traditional type of UE capable of communicating over a RAN (e.g., a cell phone). For example, a third party UE 106 may attempt to establish a connection with a UE associated with a particular telephone number in order to initiate a call, send a text, and/or transfer other data (e.g., an electronic mail message, an instant message, etc.). The call routing system 130 may receive a connection request from the third party UE 106 in which the connection request includes the telephone number. The call routing system 130 can query the user account data store 144 using the telephone number to identify UE 102, 104 address(es) that are associated with the user account that is associated with the provided telephone number. Once the UE 102, 104 address(es) are identified, the call routing system 130 can forward the connection request to one or more of the UEs 102, 104 corresponding to the identified address(es). As an illustrative example, if the third party UE 106 provides a telephone number that corresponds with a first user account, and the first user account is associated with an address corresponding to a first secondary UE 104 and an address corresponding to a second secondary UE 104, then the call routing system 130 can forward the connection request to the first secondary UE 104, the second secondary UE 104, or both. Thus, a single telephone number may be associated with multiple UEs 104 such that the subscriber can accept the connection request using the UE 104 that is most convenient for the subscriber.

Similarly, the same UE 102, 104 address can be stored in association with different user accounts in the user account data store 144. As an illustrative example, a first user account may be associated with a first telephone number and a second user account may be associated with a second telephone number. The two telephone numbers, however, may be associated with members of the same family who occasionally use the same first primary UE 102. Thus, the address of the first primary UE 102 may be associated with both user accounts. If a third party UE 106 attempts to initiate a connection with the first telephone number, the call routing system 130 can forward the request to the first primary UE 102. Likewise, if a third party UE 106 attempts to initiate a connection with the second telephone number, the call routing system 130 can forward the request to the first primary UE 102 as well.

The call routing system 130 and/or the UE management system 140 may be a single computing device or may include multiple distinct computing devices, such as computer servers, logically or physically grouped together to collectively operate as a server system. The components of the call routing system 130 and/or the UE management system 140 can each be implemented in application-specific hardware (e.g., a server computing device with one or more ASICs) such that no software is necessary, or as a combination of hardware and software. In addition, the modules and components of the call routing system 130 and/or the UE management system 140 can be combined on one server computing device or separated individually or into groups on several server computing devices. In some embodiments, the call routing system 130 and/or the UE management system 140 may include additional or fewer components than illustrated in FIG. 1.

Example Block Diagram for Activating User Equipment

Figure 2:
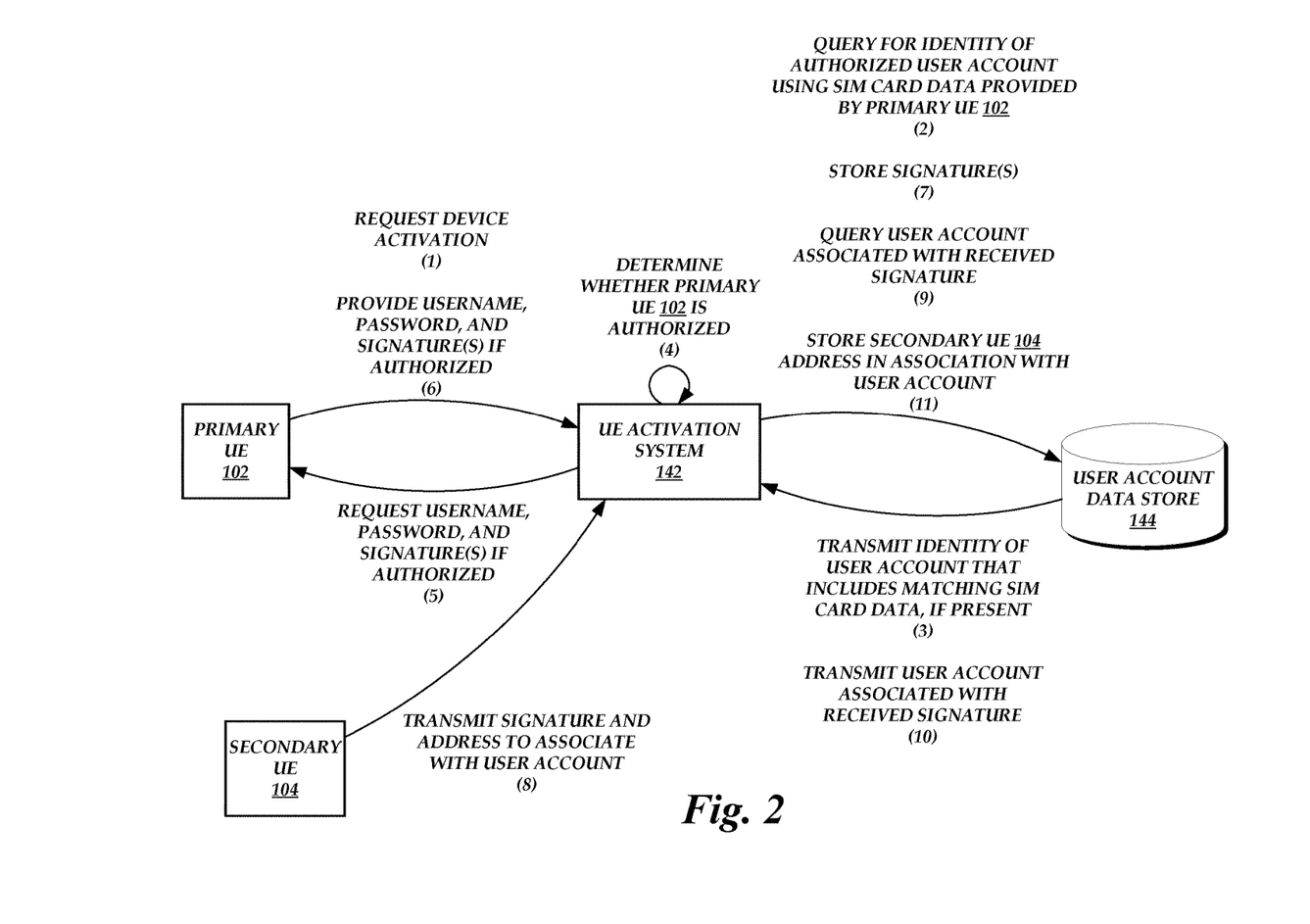
FIG. 2 is a block diagram of the UE management and communication routing environment of FIG. 1 illustrating the operations performed by the components of the UE management and communication routing environment to activate a primary UE and a secondary UE, according to one embodiment.

FIG. 2 is a block diagram of the UE management and communication routing environment 100 of FIG. 1 illustrating the operations performed by the components of the UE management and communication routing environment 100 to activate a primary UE 102 and a secondary UE 104, according to one embodiment. As illustrated in FIG. 2, the primary UE 102 may transmit a device activation request to the UE activation system 142 at (1). The request may include SIM card data and/or an address of the primary UE 102.

The UE activation system 142 may then verify whether the primary UE 102 is authorized to access the core network 110 and/or the access network 120 by querying the user account data store 144 for the identify of an authorized user account that corresponds with the provided SIM card data at (2). For example, the UE activation system 142 may query the user account data store 144 using the provided SIM card data to identify the identity of a user account that is associated with SIM card data that matches the SIM card data provided by the primary UE 102, if present. The user account data store 144 may return the identity of the user account that includes SIM card data that matches the SIM card data provided by the primary UE 102 at (3), if present. The UE activation system 142 may use the results of the query to determine whether the primary UE 102 is authorized to access the core network 110 and/or the access network 120 at (4). For example, if the user account data store 144 returns the identity of a user account that includes matching SIM card data, then the UE activation system 142 determines that the primary UE 102 is authorized to access the core network 110 and/or access network 120. Otherwise, if the user account data store 144 does not return the identity of a user account that includes matching SIM card data, then the UE activation system 142 determines that the primary UE 102 is not authorized to access the core network 110 or access network 120.

If the UE activation system 142 determines that the primary UE 102 is authorized, then the UE activation system 142 transmits a request to the primary UE 102 to provide a username and password combination and one or more signatures at (5). The primary UE 102 may then prompt a subscriber to provide the requested information and the primary UE 102 transmits the username and password combination and the one or more signatures to the UE activation system 142 at (6). The UE activation system 142 then stores the username and password combination and/or the signature(s) in the user account data store 144 at (7) in association with an entry corresponding to the user account identified by the user account data store 144 as having matching SIM card data. Before or after transmitting the request to the primary UE 102 to provide the username and password combination and the one or more signatures, the UE activation system 142 also stores the primary UE 102 address in the user account data store 144.

At a future time, a subscriber may attempt to activate or associate a secondary UE 104 with a user account. The secondary UE 104 may not have a SIM card or any mechanism for allowing the subscriber to provide a username and password combination. Thus, the secondary UE 104 may transmit a request to associate with a user account that includes a signature and an address of the secondary UE 104 at (8). The UE activation system 142 may then query the user account data store 144 using the received signature to identify the user account associated with the received signature at (9). The user account data store 144 then returns the user account associated with the received signature at (10). Using the returned user account, the UE activation system 142 can then store the secondary UE 104 address in the user account data store 144 in association with the returned user account.

Example Block Diagram for Connecting a Third Party UE to Multiple UEs

Figure 3:
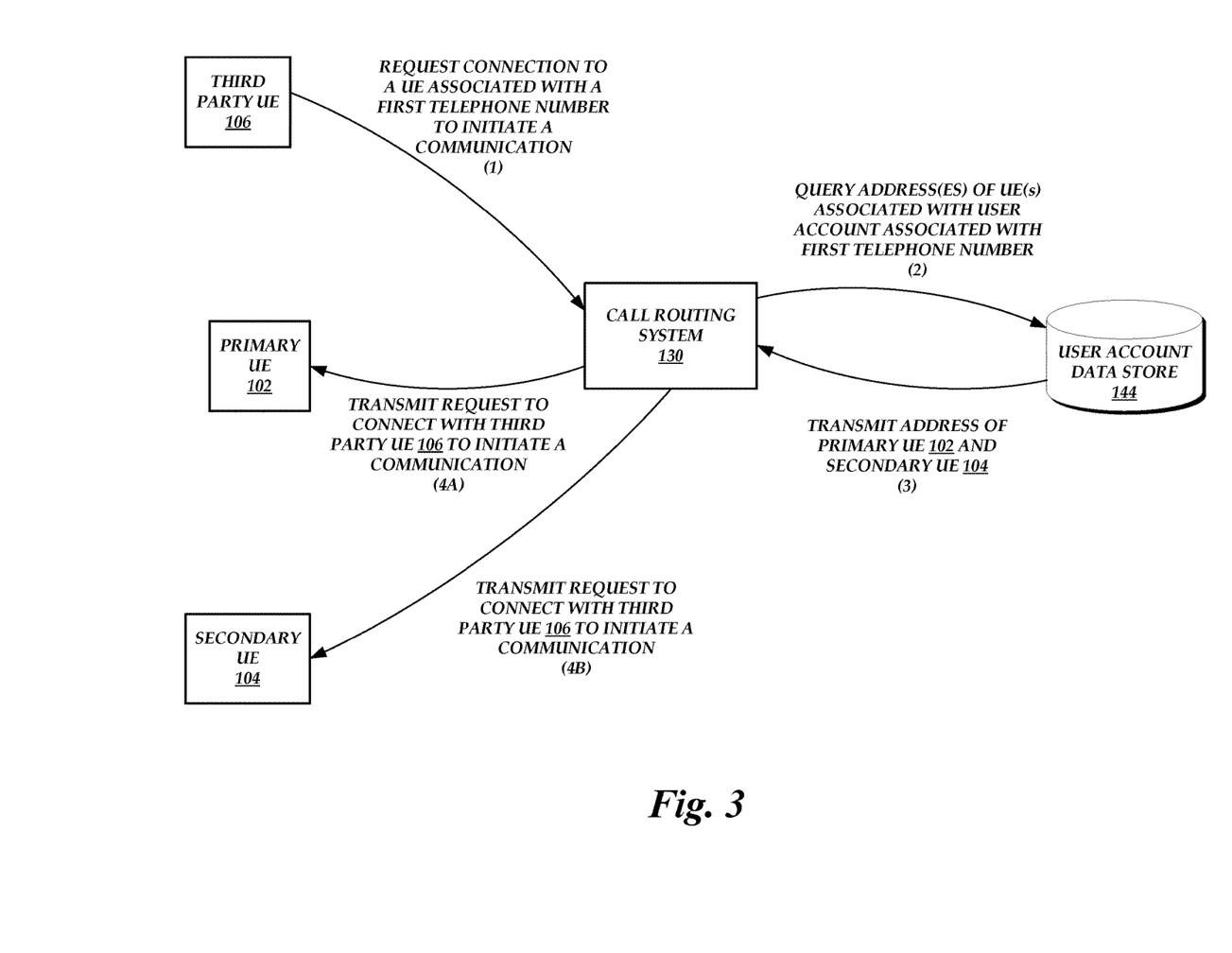
FIG. 3 is a block diagram of the UE management and communication routing environment of FIG. 1 illustrating the operations performed by the components of the UE management and communication routing environment to establish a connection between a third party UE and the primary UE or a secondary UE, according to one embodiment.

FIG. 3 is a block diagram of the UE management and communication routing environment 100 of FIG. 1 illustrating the operations performed by the components of the UE management and communication routing environment 100 to establish a connection between a third party UE 106 and the primary UE 102 or a secondary UE 104, according to one embodiment. As illustrated in FIG. 3, the third party UE 106 requests a connection to a UE associated with a first telephone number to initiate a communication (e.g., telephone call, text, or other data exchange) at (1). The call routing system 130 receives the request and queries the user account data store 144 using the first telephone number to identify address(es) of UEs associated with a user account that is associated with the first telephone number at (2).

In response to the query, the user account data store 144 returns the address of the primary UE 102 and the address of the secondary UE 104 at (3) to satisfy the query request. Thus, the call routing system 130 receives information indicating that the primary UE 102 and the secondary UE 104 are both associated with the same user account that is associated with the first telephone number. Accordingly, the call routing system 130 transmits the request to connect with the third party UE 106 to initiate a communication to both the primary UE 102 at (4A) and the secondary UE 104 at (4B). The subscriber can then decide which UE 102, 104 to use to initiate the connection with the third party UE 106, if so desired.

Example Block Diagram for Connecting a Secondary UE to a Third Party UE

Figure 4:
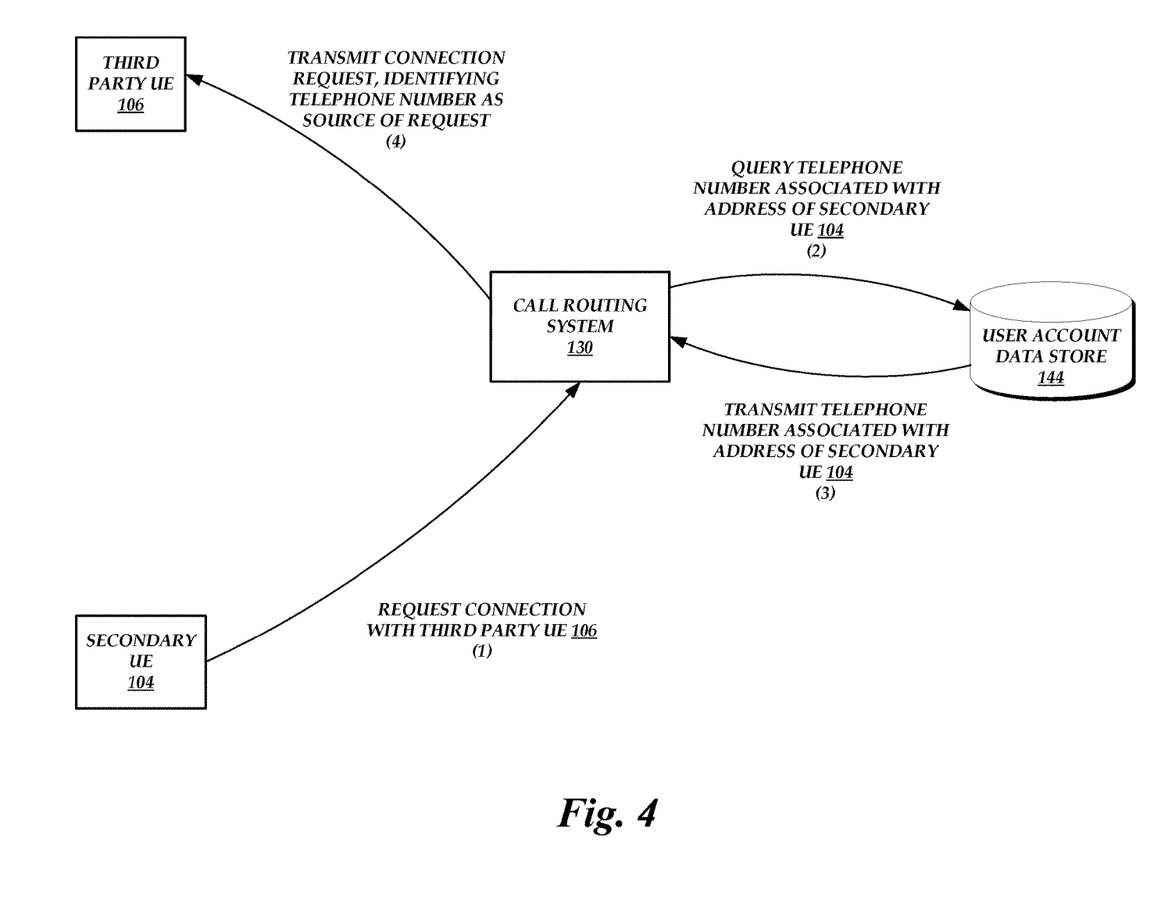
FIG. 4 is a block diagram of the UE management and communication routing environment of FIG. 1 illustrating the operations performed by the components of the UE management and communication routing environment to establish a connection between a secondary UE and a third party UE, according to one embodiment.

FIG. 4 is a block diagram of the UE management and communication routing environment 100 of FIG. 1 illustrating the operations performed by the components of the UE management and communication routing environment 100 to establish a connection between a secondary UE 104 and a third party UE 106, according to one embodiment. As illustrated in FIG. 4, the secondary UE 104 requests a connection with the third party UE 106 at (1) to, for example, initiate a communication. The request may include a telephone number of the third party UE 106 and an address of the secondary UE 104. In some embodiments, the secondary UE 104 may not have a SIM card or any other components that would allow the secondary UE 104 to communicate over a RAN. Rather, the secondary UE 104 communicates with the core network 110 and/or the access network 120 via a WLAN. Furthermore, the secondary UE 104 may be associated with a particular user account based on a signature provided by a subscriber via the secondary UE 104.

Upon receiving the request, the call routing system 130 queries the user account data store 144 using the secondary UE 104 address to identify a telephone address associated with the same user account as the secondary UE 104 address at (2). In response to the query, the user account data store 144 transmits the telephone number associated with the same user account as the secondary UE 104 address at (3). The call routing system 130 then forwards the connection request to the third party UE 106 (e.g., using the telephone number provided by the secondary UE 104) at (4), identifying the telephone number retrieved from the user account data store 144 as the source of the connection request.

Example UE Activation Routine

Figure 5:
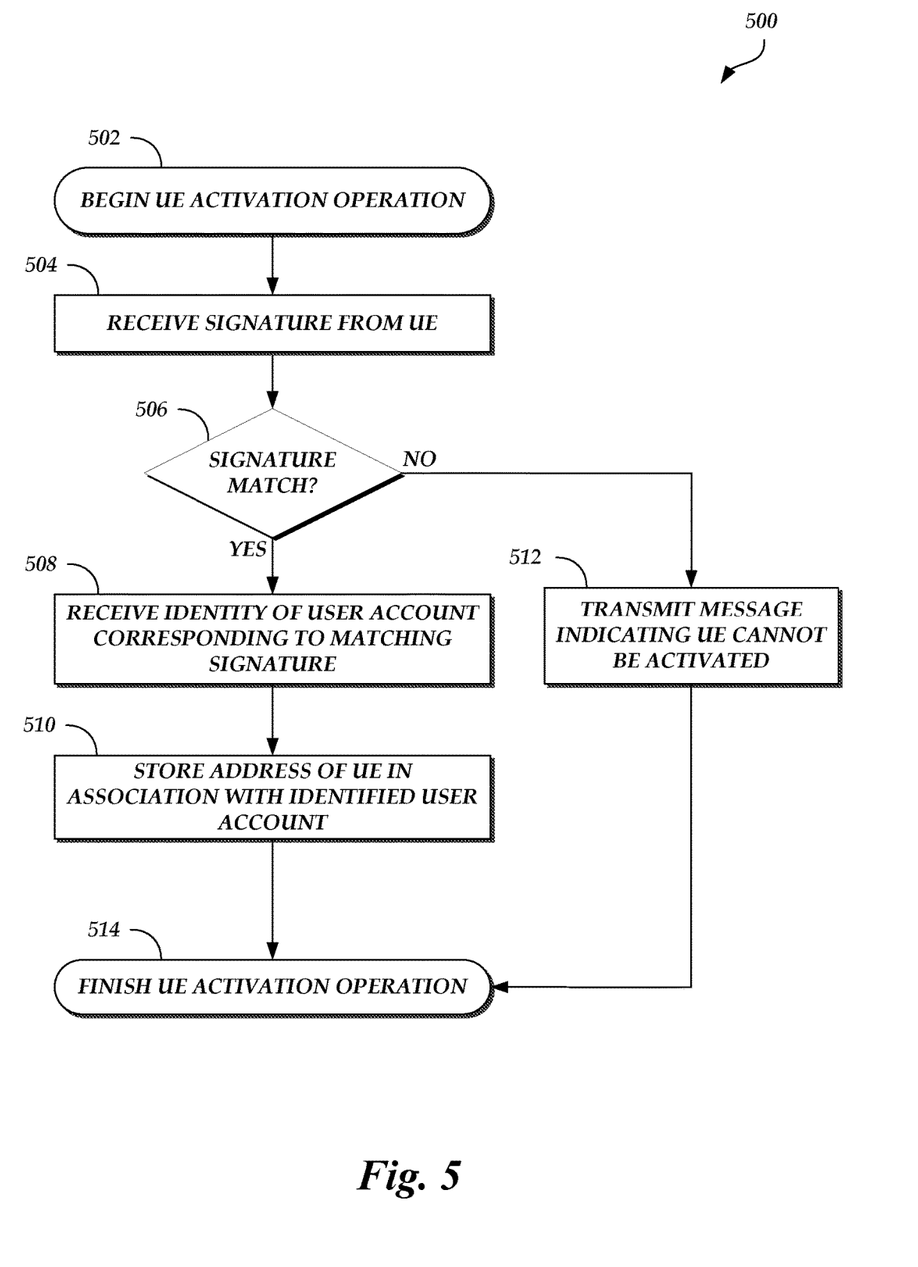
FIG. 5 is a flow diagram depicting a UE activation routine illustratively implemented by a UE activation system, according to one embodiment.

FIG. 5 is a flow diagram depicting a UE activation routine 500 illustratively implemented by a UE activation system, according to one embodiment. As an example, the UE activation system 142 of FIG. 1 can be configured to execute the UE activation routine 500. The UE activation routine 500 begins at block 502.

At block 504, a signature is received from a UE. For example, the UE may be a secondary UE 104 that does not include a SIM card or other component that would enable the secondary UE 104 to communicate via a RAN. The UE may also not have any input device that would enable a subscriber to provide a username and password combination. The UE, however, may include a component or be coupled to a device that allows the subscriber to provide a signature, such as a fingerprint scanner, a retinal scanner, a microphone, a keypad, and/or the like.

At block 506, whether the received signature matches a stored signature is determined. For example, the UE activation routine 500 may determine whether the received signature matches any signature stored in the user account data store 144. If there is a signature match, then the UE activation routine 500 proceeds to block 508. Otherwise, if there is no signature match, then the UE activation routine 500 proceeds to block 512.

At block 508, an identity of a user account corresponding to the matching signature is received. For example, in response to the signature query, the user account data store 144 may return the identity of a user account that is associated with a signature that matches the provided signature (if such a match exists).

At block 510, an address of the UE is stored in association with the identified user account. Thus, the UE is now activated and/or associated with the user account such that any connection request directed to the user account may be forwarded to the UE. Similarly, the UE can be used to initiate a communication with another UE, where the communication may appear to originate from a telephone number associated with the identified user account. After the received signature is stored, the UE activation routine 500 is complete, as shown at block 514.

At block 512, a message is transmitted to the UE indicating that the UE cannot be activated. For example, the UE may not be activated because the subscriber provided an incorrect signature and/or a signature that was not previously provided by the subscriber when using an authorized UE. After the message is transmitted, the UE activation routine 500 is complete, as shown at block 514.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
   receiving, from a user equipment (UE), a first signature captured by the UE, wherein the UE lacks an interface for inputting text;
   querying a data store using the received first signature;
   determining that a first user account is associated with the received first signature; and
   associating the UE with the first user account such that a communication request intended for a telephone number associated with the first user account can be routed to the UE.

2. The computer-implemented method of claim 1, further comprising:
   receiving subscriber identification module (SIM) card data from a second UE;
   querying the data store using the SIM card data;
   determining that the first user account is associated with the SIM card data;
   transmitting, to the second UE, a request for the first signature;
   receiving the first signature; and
   storing the first signature in the data store in an entry associated with the first user account.

3. The computer-implemented method of claim 2, wherein the second UE is configured to connect to a telecommunications network via a radio access network (RAN).

4. The computer-implemented method of claim 3, wherein the UE is configured to connect to the telecommunications network via a wireless local area network (WLAN) and not the RAN.

5. The computer-implemented method of claim 1, wherein the first signature comprises one of a fingerprint scan, a retinal scan, a personal identification number (PIN), or a voice command.

6. The computer-implemented method of claim 1, further comprising:
   receiving a second signature from the UE;
   querying the data store using the received second signature;
   determining that a second user account is associated with the received second signature; and
   associating the UE with the second user account such that a second communication request intended for a second telephone number associated with the second user account can be routed to the UE.

7. The computer-implemented method of claim 1, wherein associating the UE with the first user account further comprises associating one of an Internet protocol (IP) address of the UE or a media access control (MAC) address of the UE with the first user account.

8. Non-transitory, computer-readable storage media comprising computer-executable instructions, wherein the computer-executable instructions, when executed by a computer system, cause the computer system to:
   receive, from a user equipment (UE), a first signature captured by the UE, wherein the UE lacks an interface for inputting text;
   query a data store using the received first signature;
   determine that a first user account is associated with the received first signature; and
   associate the UE with the first user account such that a communication request intended for a subscriber associated with the first user account can be routed to the UE.

9. The non-transitory, computer-readable storage media of claim 8, wherein the computer-executable instructions further cause the computer system to:
   receive subscriber identification module (SIM) card data from a second UE;
   query the data store using the SIM card data;
   determine that the first user account is associated with the SIM card data;
   transmit, to the second UE, a request for the first signature;
   receive the first signature; and
   store the first signature in the data store in an entry associated with the first user account.

10. The non-transitory, computer-readable storage media of claim 9, wherein the second UE is configured to connect to a telecommunications network via a radio access network (RAN).

11. The non-transitory, computer-readable storage media of claim 10, wherein the UE is configured to connect to the telecommunications network via a wireless local area network (WLAN) and not the RAN.

12. The non-transitory, computer-readable storage media of claim 8, wherein the first signature comprises one of a fingerprint scan, a retinal scan, a personal identification number (PIN), or a voice command.

13. The non-transitory, computer-readable storage media of claim 8, wherein the computer-executable instructions further cause the computer system to:
   receive a second signature from the UE;
   query the data store using the received second signature;
   determine that a second user account is associated with the received second signature; and
   associate the UE with the second user account such that a second communication request intended for a second subscriber associated with the second user account can be routed to the UE.

14. The non-transitory, computer-readable storage media of claim 8, wherein the computer-executable instructions further cause the computer system to associate one of an Internet protocol (IP) address of the UE or a media access control (MAC) address of the UE with the first user account.

15. A system comprising:
a data store configured to store a first signature in association with a first user account; and
a management system comprising a processor in communication with the data store and configured with specific computer-executable instructions to:
receive, from a user equipment (UE), a second signature captured by the UE, wherein the UE lacks an interface for inputting text;
query the data store using the received second signature;
determine that the first user account is associated with the received second signature based on an indication that the received second signature corresponds to the first signature; and
associate the UE with the first user account such that a communication request intended for a subscriber associated with the first user account can be routed to the UE.

16. The system of claim 15, wherein the management system is further configured with specific computer-executable instructions to:
receive subscriber identification module (SIM) card data from a second UE;
query the data store using the SIM card data;
determine that the first user account is associated with the SIM card data;
transmit, to the second UE, a request for the first signature;
receive the first signature; and
store the first signature in the data store in an entry associated with the first user account.

17. The system of claim 16, wherein the second UE is configured to connect to a telecommunications network via a radio access network (RAN).

18. The system of claim 17, wherein the UE is configured to connect to the telecommunications network via a wireless local area network (WLAN) and not the RAN.

19. The system of claim 15, wherein the second signature comprises one of a fingerprint scan, a retinal scan, a personal identification number (PIN), or a voice command.

20. The system of claim 15, wherein the management system is further configured with specific computer-executable instructions to:
receive a third signature from the UE;
query the data store using the received third signature;
determine that a second user account is associated with the received third signature; and
associate the UE with the second user account such that a second communication request intended for a second subscriber associated with the second user account can be routed to the UE.

* * * * *